United States Patent [19]
Williams et al.

[11] 4,446,389

[45] May 1, 1984

[54] QUADRATURE TACH DECODER CIRCUIT

[75] Inventors: Marshall Williams, Fremont; David C. O'Gwynn, San Mateo, both of Calif.

[73] Assignee: Ampex Corporation, Redwood City, Calif.

[21] Appl. No.: 358,395

[22] Filed: Mar. 15, 1982

[51] Int. Cl.³ .......................... H03K 5/26; H03D 13/00
[52] U.S. Cl. .................................... 307/515; 307/471; 307/516; 328/166; 328/133
[58] Field of Search ............... 307/471, 514, 515, 516; 328/133, 134, 166

[56] References Cited

U.S. PATENT DOCUMENTS

| | | | |
|---|---|---|---|
| 3,588,710 | 6/1971 | Masters | 328/133 |
| 4,308,500 | 12/1981 | Avins | 328/133 |
| 4,328,463 | 5/1982 | Avins | 328/133 |
| 4,337,435 | 6/1982 | Munoz | 307/514 |

*Primary Examiner*—John S. Heyman
*Attorney, Agent, or Firm*—Elizabeth E. Strnad; Joel D. Talcott; George B. Almeida

[57] ABSTRACT

A change in direction of a moving member is detected on the first edge of a quadrature tach pulse which is out of a given sequence, and a clock pulse is supplied whose rising edge always occurs after the direction change.

7 Claims, 5 Drawing Figures

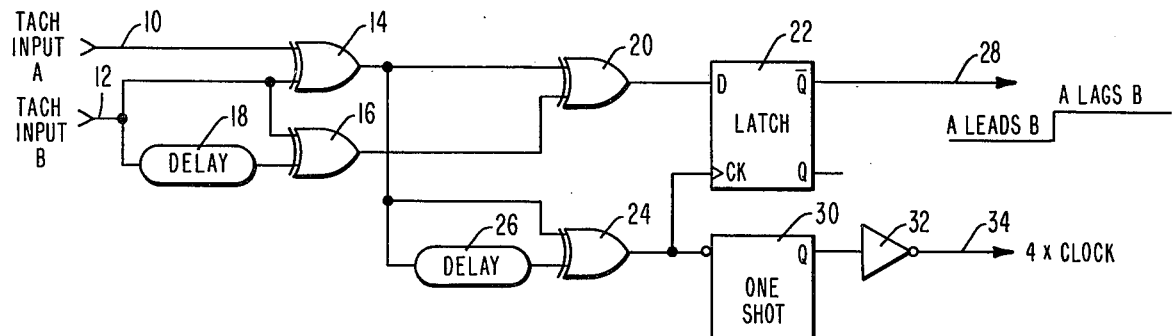
FIG_1
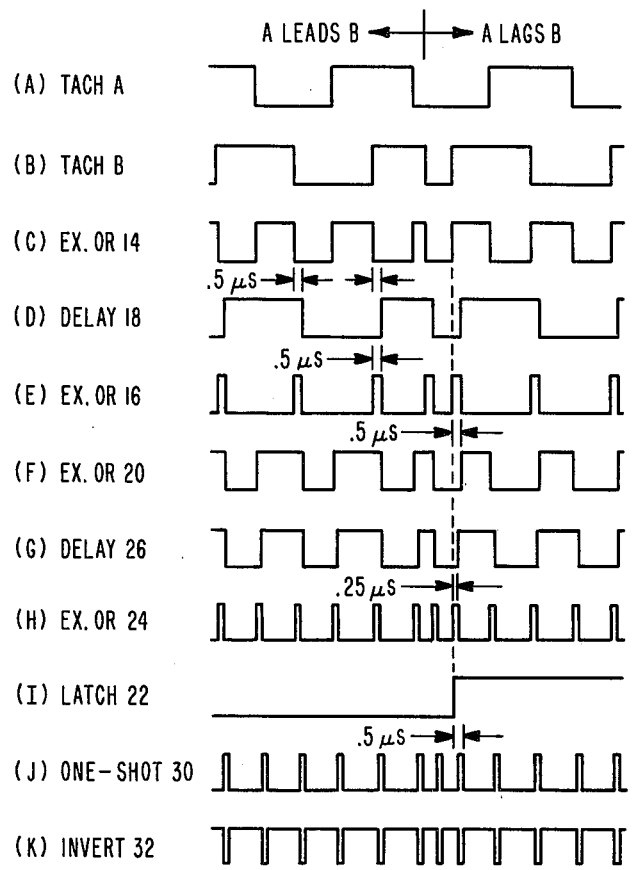
FIG_2

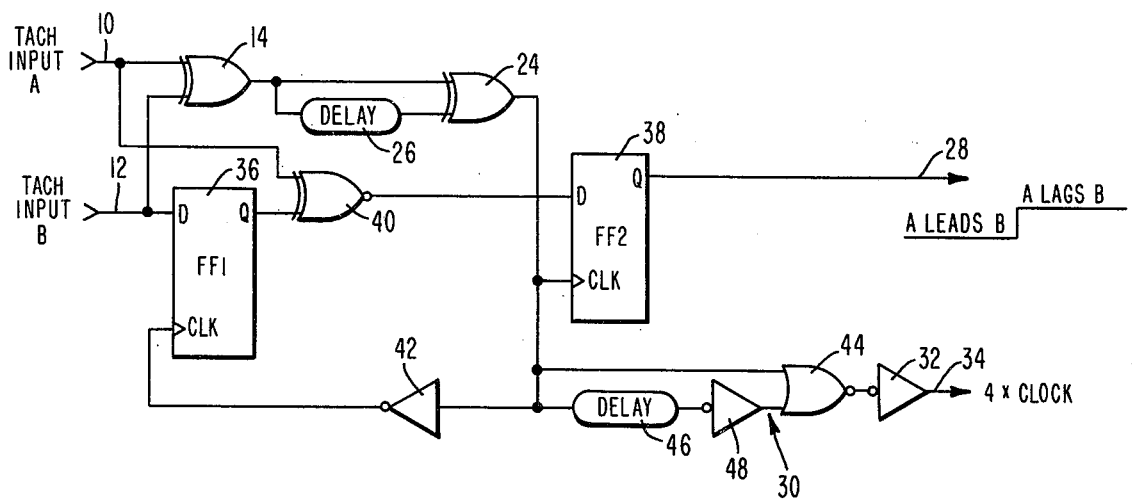
FIG_3
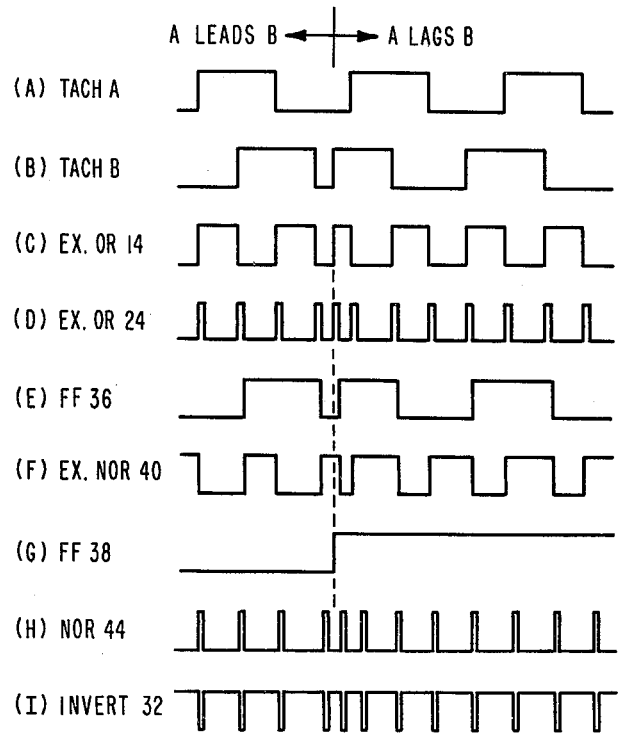
FIG_4

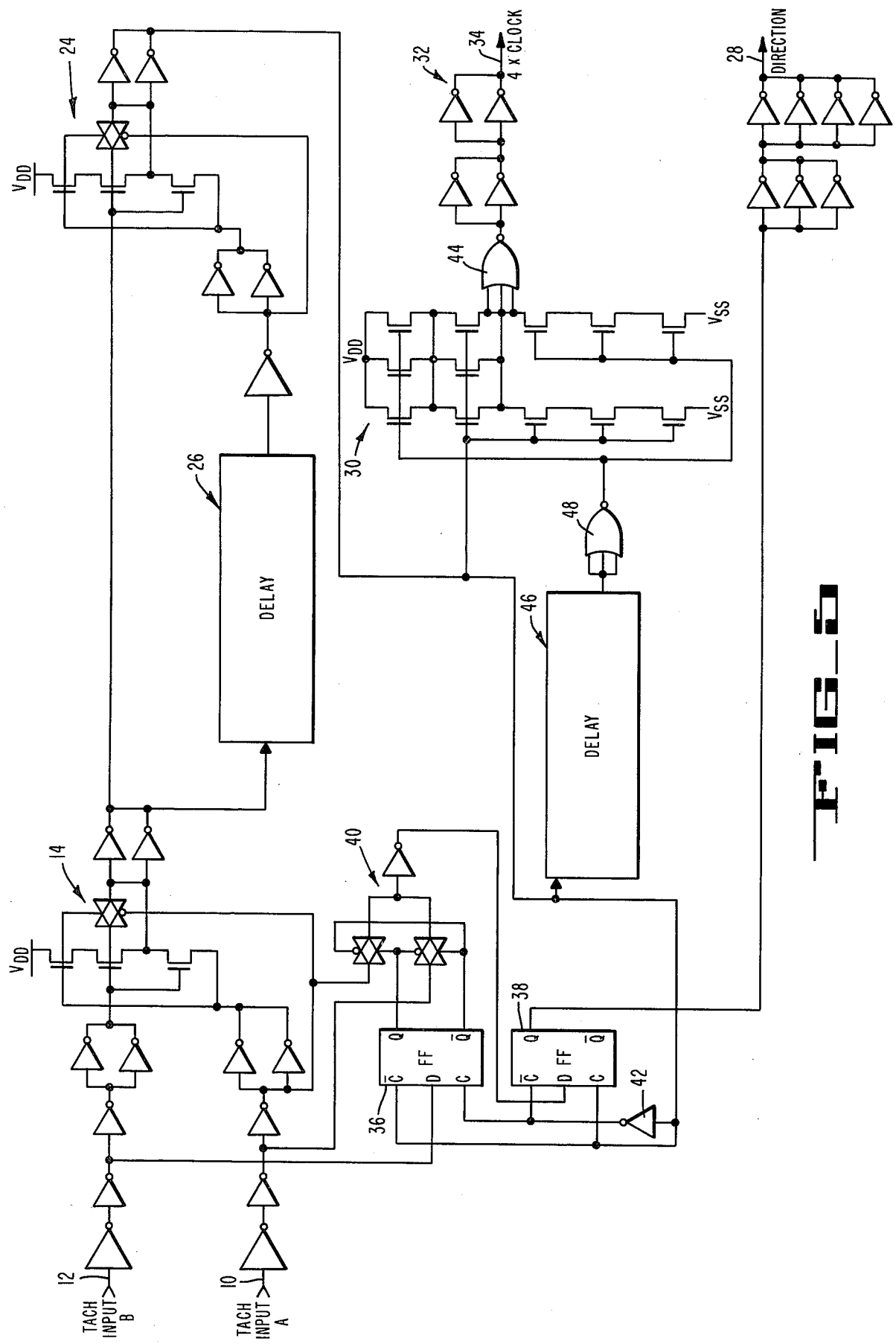

QUADRATURE TACH DECODER CIRCUIT

BACKGROUND AND SUMMARY OF THE INVENTION

The invention relates to sensing the direction and rate of rotation of a rotating member and more particularly to a circuit for detecting a rotational direction change on the first edge of a tach pulse that is out of sequence. The circuit also may be used to detect linear motion, i.e., x-y position, direction, etc.

There are various servo systems, particularly in the fields of television, audio, instrumentation, manufacturing, etc., which are employed to control precisely the speed and position of a rotating member such as a reel, capstan, disc, etc., or to control the linear speed and position of a translating member. To provide such control, it is necessary first to detect precisely the direction and rate of rotation of the rotating member. In addition, in very sophisticated systems, it is preferable that detection occurs at a very fast response time.

Typical of rotation sensing circuits are those employed in conjunction with a pair of rotation sensing tachs disposed 90° apart, i.e., in quadrature, which tachs generate two pulse trains with a phase relationship indicative of the direction and a frequency indicative of the rate of rotation of the member. Most of these sensing circuits require one or more pulses from each phase of the two phase tachs before a change in direction of rotation can be detected. It follows that the response times of such circuits are correspondingly compromised, and ambiguous signals are generated in instances where the rotating member experiences multiple direction changes before two tach pulses have occurred.

The invention overcomes the disadvantages of the above movement sensing circuits and may be used in any control system wherein tach pulses indicative of rotational or translational direction and rate are generated.

To this end, an exclusive OR gate compares a preselected short pulse with a waveform which defines the phase relationship between tach A and tach B pulses. In one embodiment the resulting output is fed to a latch along with narrow clock pulses. If tach A leads tach B in phase, the latch input always is high when a narrow clock pulse occurs. If tach A lags, the latch input always is low during the narrow clock pulse. The first edge of tach A or tach B that is out of sequence causes the latch to change states, thus indicating a change in the direction of rotation prior to the occurrence of the next tach pulse.

Thus it is an object of the invention to provide a precision direction sense circuit with very fast response time.

Another object is to provide a quadrature tach decoder circuit which detects a change of rotational or translational direction on the first edge of a tach pulse that is out of sequence.

A further object is to provide a quadrature tach decoder circuit which delivers a clock pulse whose rising edge always occurs after a direction change.

Still another object is to provide a quadrature tach decoder circuit which detects linear motion, i.e., position and direction of a translating member.

BRIEF DESCRIPTION OF THE DRAWINGS

FIG. 1 is schematic diagram exemplifying the invention combination.

FIGS. 2A–2K is a graph depicting the waveforms generated at various points in the schematic of FIG. 1.

FIG. 3 is a schematic diagram of an alternative embodiment of the invention.

FIGS. 4A–4I is a graph depicting the waveforms generated at various points in the schematic of FIG. 3.

FIG. 5 is a detailed schematic of the circuit of FIG. 3.

DESCRIPTION OF THE PREFERRED EMBODIMENTS

Referring to FIGS. 1 and 2, a pair of input terminals 10, 12 receive respective squarewave signals, herein labeled tach inputs A and B, respectively. The two squarewave signals A and B are 90° apart in phase as depicted in FIGS. 2A, 2B, and are generated via generally conventional quadrature tach devices (not shown) coupled to sense the movement of the rotating member, or of the linear member, under control (not shown). Tachs A and B are coupled via the terminals 10, 12 to an exclusive OR gate 14 for comparison. Tach B also is fed directly to one input of an exclusive OR gate 16, and to the other input thereof via a short duration (e.g., 0.5 microsecond) delay 18 (FIG. 2D). The output waveform from the gate 14 is a squarewave signal at twice the frequency of either tach input A or B (FIG. 2C), and is fed to another exclusive OR gate 20. The output of gate 16 (FIG. 2E) is a pulse train of short duration pulses (e.g., 0.5 us) generated on the rising and falling edges of tach input B. The short pulses are fed to the second input of exclusive OR gate 20. The latter gate 20 compares the twice-frequency signal with the short pulses, and supplies the resulting signal of FIG. 2F, corresponding to the direction pulse sequence, to the D input of a D-type latch 22.

The output from exclusive OR gate 14 is coupled directly to one input of another exclusive OR gate 24, and also to the second input thereof via a very short delay 26 (e.g., 0.25 us) shown in FIG. 2G. Gate 24 and delay 26 generate narrow clock pulses as in FIG. 2H, on every edge of both tach inputs A and B. The resulting narrow clock pulses have four times the frequency of the tach inputs and are used to clock the D-type latch 22.

Thus, if the phase of tach A leads that of tach B in time, the "D" input of the latch 22 is always high when a clock pulse occurs, and the latch Q output corresponding to the direction signal is low (FIG. 2I). Conversely, when the phase of tach A lags tach B, the D input is always low during the clock pulse, and the latch 22 Q output direction signal is high (FIG. 2I). Therefore, when the direction of rotation of the rotating element changes, the first edge of tach A or of tach B that is out of sequence causes the latch 22 to change state. If the latch 22 output on an output terminal 28 is low, phase A leads B, and if the output on terminal 28 is high, phase A lags B.

The narrow clock pulses of exclusive OR gate 24 are fed to a one-shot multivibrator 30 with inherent 0.25 us delay, and thence to an inverter 32. The one-shot 30 produces positive pulses when triggered by a negative-going input (FIG. 2J) which positive pulses are inverted by inverter 32 and are provided as negative pulses on output terminal 34 at four times the frequency of the tach inputs A, B (FIG. 2K). As may be seen in FIG. 2K, output terminal 34 provides a 4× tach clock pulse whose rising edge always occurs after a direction change.

Although only one set of operating conditions is depicted in FIG. 2, it is to be understood that various different sets of conditions are possible, depending upon the direction of motion, etc., with corresponding pulse waveforms. In all cases however, the circuit senses the change of sequence of the tach pulses to determine the change of rotational or linear direction.

FIG. 3 depicts an alternative embodiment of the invention combination, wherein similar components are similarly numbered. FIG. 4 illustrates the waveforms generated by the circuit of FIG. 3. Essentially, delay 18 and exclusive OR gate 16 are replaced with a D-type flip-flop 36, the exclusive OR gate 20 is defined by an exclusive NOR gate 40, while the D-type latch 22 is defined by a D-type flip-flop 38.

Thus, tach input A (FIG. 4A) is fed via terminal 10 to both the exclusive OR gate 14, and the exclusive NOR gate 40, and tach input B (FIG. 4B) is fed via terminal 12 to gate 14 and also to the D input of the flip-flop 36. Flip-flop 36 is triggered by the negative edge of the 4×-tach clock pulses (FIG. 4D) from the exclusive OR gate 24. Given a state at the D input, when the clock pulse of gate 24 falls, that state is transferred to output Q of flip-flop 36. Thus the signal is delayed by the width of the clock pulse. The Q output of flip-flop 36 (FIG. 4E) is coupled to the second input of gate 40, whose output corresponds to the direction pulse sequence (FIG. 4F) and feeds the D input of the flip-flop 38. The Q output of flip-flop 38 provides the direction signal corresponding to the logic state of FIG. 4G on output terminal 28, which is identical to the signal of FIG. 2I generated by the circuit of FIG. 1. In FIG. 4, however, if the output of exclusive NOR gate 40 is low when the rising edge of the clock pulse from exclusive OR gate 24 occurs, then the output state of flip-flop 38 goes low indicating that tach A leads tach B (FIG. 4G). Upon a change of direction, the gate 40 output is high when the rising edge of the clock pulse occurs, thereby providing the immediate change of state of flip-flop 38 to a high (FIG. 4G).

Exclusive OR gate 24 supplies the 4×-tach clock pulse of FIG. 4D to clock the flip-flop 38 and also to clock flip-flop 36 via an inverter 42. The actual schematic is shown in FIG. 5, wherein there are two clock inputs on both flip-flop 36 and 38. The inverter 42 drives both the clock and clock-bar of each flip-flop with the same clock pulse.

The clock pulse of gate 24 is also coupled directly to one input of a NOR gate 44, and further to a second input of gate 44 via a delay 46 and inverter 48. The NOR gate 44, delay 46 and inverter 48 essentially define the one-shot 30 of FIG. 1. The output of NOR gate 44 (FIG. 4H) comprises the 4×-tach clock, which is inverted via the inverter 32 and supplied to the output terminal 34 as the negative pulses with positive rising edges, shown in FIG. 4I, and also in FIG. 2K. Thus it may be seen that the circuits of FIGS. 1 and 3 receive the same tach signal inputs and provide therefrom the same output control signals.

FIG. 5 depicts the schematic diagram of FIG. 3 in greater detail, with similar components being identified with similar numbers. Since the circuit and its operation is described with respect to FIGS. 3, 4 and also FIGS. 1, 2, further discussion is not believed necessary herein.

Although the invention is described herein with respect to detection of a rotating member, it is to be understood that the circuit is equally applicable to detecting the direction and rate of translation of a linear member. In such system, the pair of electrical quadrature tach signals are generated via a pair of optical, magnetic, etc., transducers operatively arranged to monitor motion of the linear member. The transducers are displaced to generate the quadrature tach signals A and B upon translation of the member. Since the configuration of such a linear, quadrature tach generating system is generally known to those skilled in the art, no further description thereof is believed necessary herein.

What is claimed is:

1. Circuit for detecting movement of a member, comprising:
    tach means for supplying two quadrature tach pulses in response to member movement;
    gate means for receiving said tach pulses and generating tach sequence pulses indicative of which tach phase is leading, and a multiple tach frequency clock;
    logic means for generating a logic state change having a first input coupled to receive said tach sequence pulses and a second input coupled to receive said clock, said first input of said logic means being in a first logic state when said clock occurs to indicate a first direction of member movement and being in a second logic state when said clock occurs to indicate a second direction; and
    means external to said gate and logic means for delaying said multiple frequency clock so that a reference edge thereof always occurs after said logic state change generated by said logic means.

2. The circuit of claim 1 wherein the gate means further includes:
    a first exclusive OR gate for comparing the two quadrature tach pulses;
    a first gate/delay means coupled to a first of the tach pulses for generating a short duration pulse; and
    a second exclusive OR gate coupled to the first exclusive OR gate and to the first gate/delay means for generating the tach sequence pulses;
    said first input of the logic means being coupled to the second exclusive OR gate to generate the logic state indicative of the tach sequence in response to the clock.

3. The circuit of claim 2 wherein:
    said gate means further includes a second gate/delay means is coupled to an output of the first exclusive OR gate; and
    said second input of the logic means is clocked by an output of said second gate/delay means.

4. A circuit for decoding quadrature tach pulses, comprising:
    first exclusive OR gate means for comparing the tach pulses and for generating 2-times tach frequency pulses;
    first means including a delay coupled to receive one of said tach pulses for generating a narrow pulse at each of the tach pulse edges;
    second exclusive OR gate means coupled to receive the 2-times tach pulses and the narrow pulses for generating tach sequence pulses;
    second means including a delay coupled to the first exclusive OR gate means for generating 4-times tach frequency pulses;

bistable logic means coupled to the second exclusive OR gate means for generating a selected logic state in response to the 4-times tach pulses; and means for delaying said 4-times tach frequency pulses so that a reference edge thereof always occurs after a change in the logic state of the bistable logic means.

5. The circuit of claim 1 wherein the gate means further includes:

a first exclusive OR gate for comparing the two quadrature tach pulses;

a bistable logic means having a first input coupled to receive and delay a second one of said tach pulses and having a second input for receiving said multiple tach frequency clock; and a second exclusive OR gate for comparing a first and said delayed second tach pulses for generating the tach sequence pulses.

6. The circuit of claim 5 wherein the gate means further include:

a gate/delay means coupled to an output of the first exclusive OR gate and having an output providing said multiple tach frequency clock.

7. A circuit for decoding quadrature tach pulses, comprising:

first exclusive OR gate means for receiving and comparing the tach pulses and for generating 2-times tach frequency pulses;

means including a delay coupled to an output of the first exclusive OR gate means for generating a 4-times tach frequency pulses;

a first bistable logic means having a first input coupled to receive and delay a second one of said tach pulses and having a clock input for receiving said 4-times tach frequency pulses;

a second exclusive OR gate coupled to compare a first and said delayed second tach pulses and to generate tach sequence pulses;

a second bistable logic means having a first input coupled to an output of said second exclusive OR gate for generating a selected logic state in response to the 4-times tach frequency pulses; and means for delaying said 4-times tach frequency pulses so that a reference edge thereof always occurs after a change in the logic state of the second bistable logic means.

* * * * *